United States Patent
Carlberg et al.

(10) Patent No.: US 12,521,802 B2
(45) Date of Patent: Jan. 13, 2026

(54) METAL CUTTING INSERT FOR A DRILL TOOL AND A DRILL TOOL

(71) Applicant: AB SANDVIK COROMANT, Sandviken (SE)

(72) Inventors: Hakan Carlberg, Sandviken (SE); Patrik Harstrom, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 492 days.

(21) Appl. No.: 18/013,223

(22) PCT Filed: Apr. 21, 2021

(86) PCT No.: PCT/EP2021/060366
§ 371 (c)(1),
(2) Date: Dec. 27, 2022

(87) PCT Pub. No.: WO2022/002456
PCT Pub. Date: Jan. 6, 2022

(65) Prior Publication Data
US 2023/0256523 A1    Aug. 17, 2023

(30) Foreign Application Priority Data
Jul. 1, 2020 (EP) .................... 20183360

(51) Int. Cl.
*B23B 51/00* (2006.01)
(52) U.S. Cl.
CPC ...... *B23B 51/0007* (2022.01); *B23B 2200/24* (2013.01)

(58) Field of Classification Search
CPC . B23B 51/02; B23B 51/0007; B23B 51/0003; B23B 51/0006; B23B 51/0008; B23B 51/0011; B23B 2200/24
See application file for complete search history.

(56) References Cited

U.S. PATENT DOCUMENTS

| 5,232,319 A | 8/1993 | Satran et al. |
| 5,688,083 A * | 11/1997 | Boianjiu ................. B23B 51/00 407/113 |
| 8,840,346 B2 * | 9/2014 | Ishi ....................... B23B 27/145 408/231 |
| 2008/0232912 A1 | 9/2008 | Bhagath |

FOREIGN PATENT DOCUMENTS

| EP | 1270122 A1 | 1/2003 |
| WO | 2013016018 A2 | 1/2013 |

* cited by examiner

*Primary Examiner* — Nicole N Ramos
(74) *Attorney, Agent, or Firm* — Corinne R. Gorski

(57) ABSTRACT

A metal cutting drill insert for a drill tool has opposing top and bottom surfaces with a symmetry axis extending therebetween. At least one stepped cutting edge is configured to cut a continuous chip along the at least one stepped cutting edge. The at least one stepped cutting edge is formed at an intersection of a rake face and an adjoining clearance face of the side surface. In a top view facing the top surface the at least one stepped cutting edge includes a step formed by a transitional edge between a first part and a second part edge. The step extends in a radial direction relative the symmetry axis by a first distance h1, and in a side view facing the side surface the step extends in a direction from the bottom surface towards the top surface by a second distance h2, wherein $0.8 \cdot h1 \leq h2 \leq 1.2 \cdot h1$.

10 Claims, 3 Drawing Sheets

Figure 1:
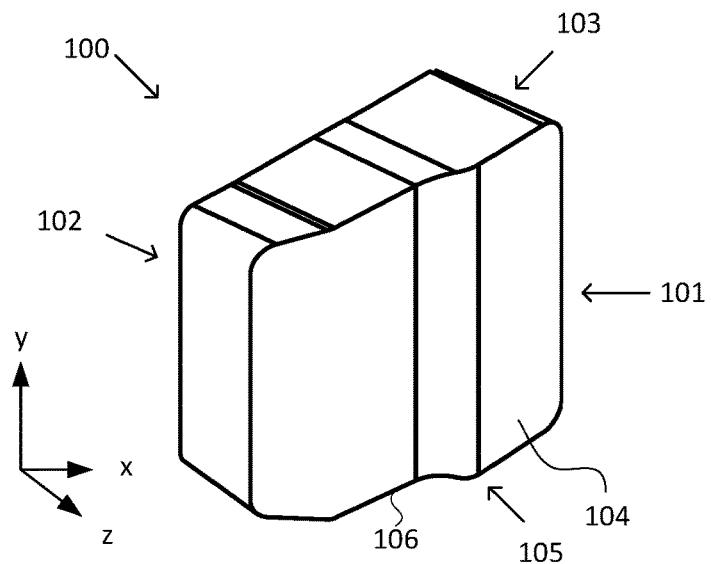

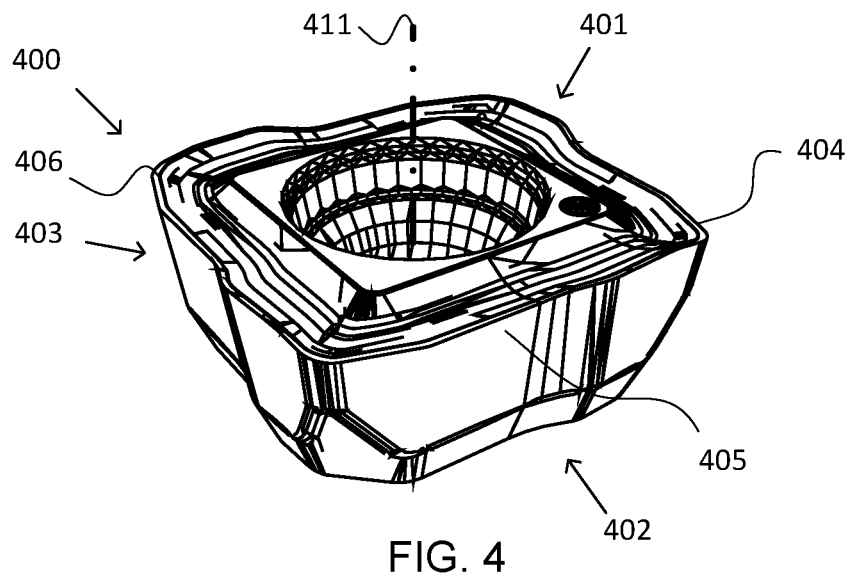
FIG. 4
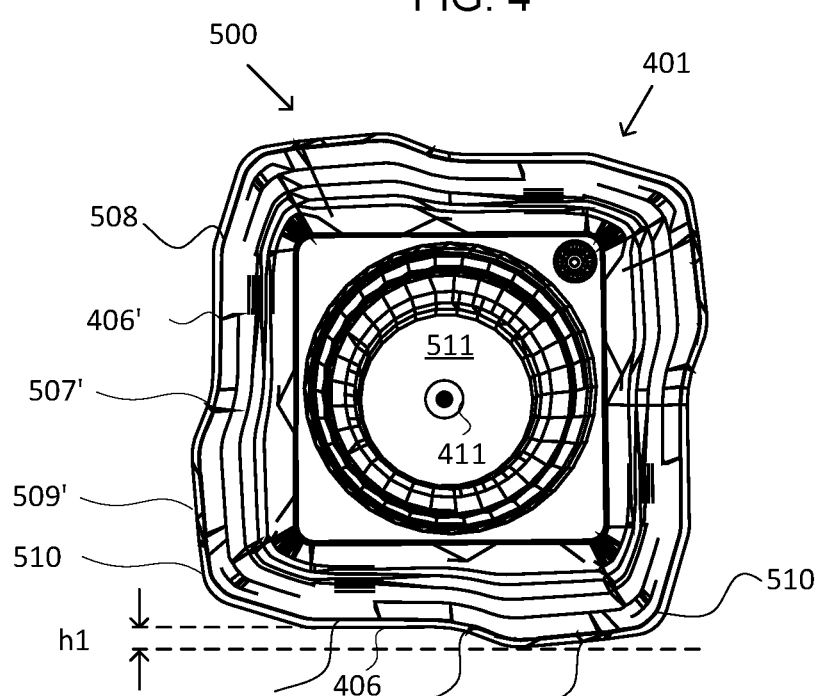
FIG. 5
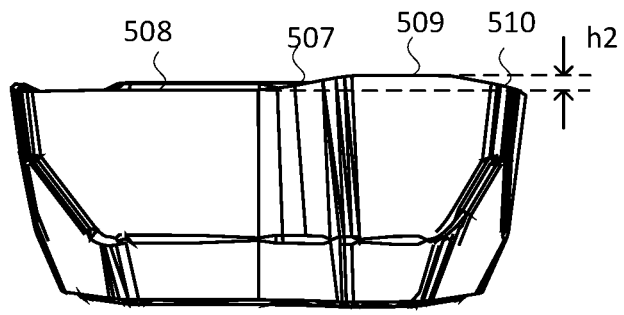

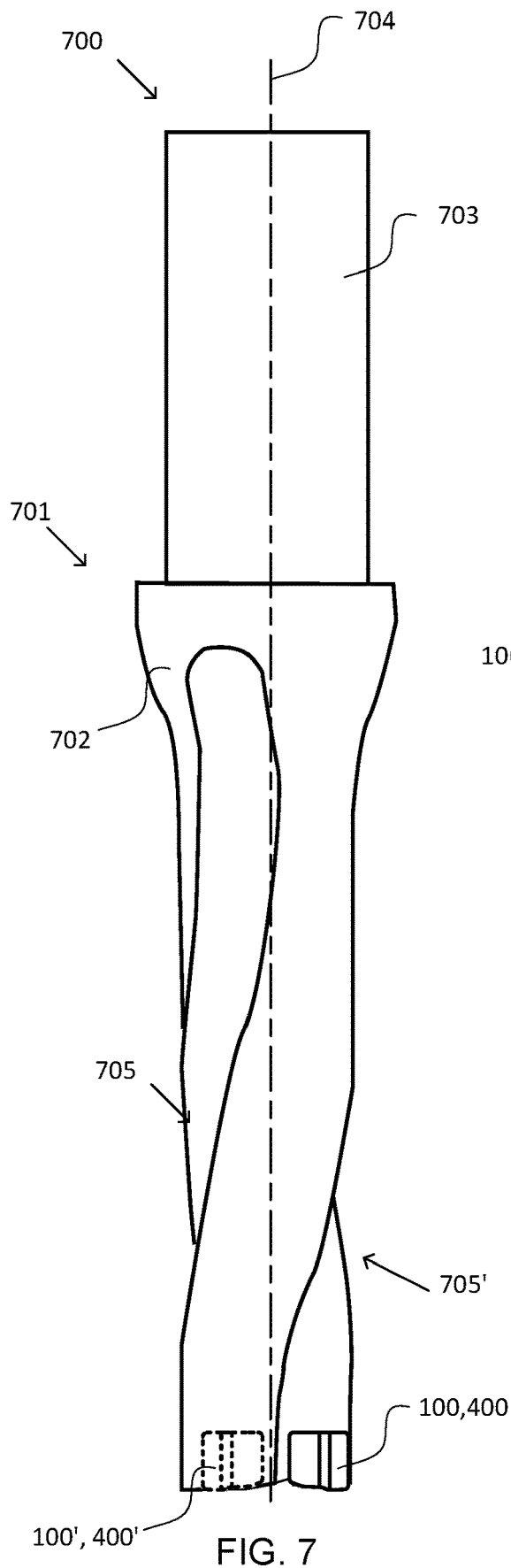
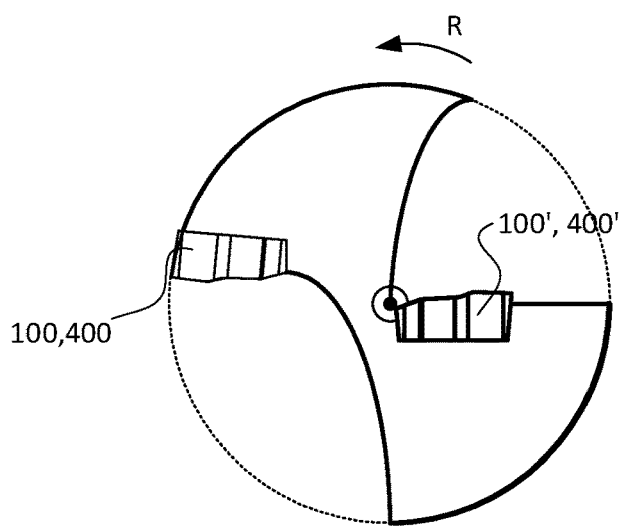
FIG. 7
FIG. 8

METAL CUTTING INSERT FOR A DRILL TOOL AND A DRILL TOOL

RELATED APPLICATION DATA

This application is a § 371 National Stage Application of PCT International Application No. PCT/EP2021/060366 filed Apr. 21, 2021 claiming priority to EP 20183360.5 filed Jul. 1, 2020.

TECHNICAL FIELD

The present invention relates to a metal cutting insert for a drill tool, more particular to a metal cutting insert with a stepped cutting edge.

The present invention also relates to a drill tool.

BACKGROUND

In modern subtractive manufacturing drilling is an important operation and especially drilling in metal proves to be a demanding operation.

In metal drilling a drill tool with replaceable metal cutting inserts is often used, especially in CNC operations. A modern drill tool of the previously discussed type often comprises a center insert for drilling the center region of the drilled hole, and a peripheral insert for removing material in the peripheral region of the drilled hole. Due to different cutting geometries the center insert and the peripheral insert often employs different geometries. A recent geometry for a center insert employs a stepped edge with a smooth transition from a first part edge to a second part edge. The smooth transition is commonly called a transitional edge, or transitional region. It is advantageous to cut continuous chips of a predetermined length from the drilled material. Chip control is of utmost importance in modern CNC metal drilling, and especially chip evacuation has a large impact on the surface finish of the drilled hole, and also impacts the drill speed.

There is a problem with inserts that employs stepped edges due to the fact that a cut chip that moves from the stepped cutting edge over the release side of the insert experience an increased temperature in the transitional region. This increased temperature may have a detrimental effect on the lifetime of the insert and especially the transitional edge.

Therefore, it is a need for improvements in a metal cutting insert such that the temperature is reduced in the transitional region.

It is therefore an object of the present invention to present an improved metal cutting insert that reduces the temperature in the transitional region.

SUMMARY

The present inventors have realized that the increased temperature in the transitional region of the stepped edge is caused by compression of the chip in the transitional region. The present inventors realized that such an increased temperature may be reduced by incorporating a step of the stepped edge in a side view of the metal cutting insert in addition to the conventional step as seen in the top view of the insert.

The metal cutting insert according to the present invention comprises: opposing top surface and bottom surface with a symmetry axis of the cutting drill insert extending there between, and a peripheral side surface extends between said top surface and said bottom surface. The top surface comprises a rake face and the side surface comprises a clearance face; at least one stepped cutting edge configured to cut a continuous chip along said at least one stepped cutting edge, wherein said at least one stepped cutting edge is formed at an intersection of a rake face of the top surface and an adjoining clearance face of the side surface, wherein in a top view facing the top surface of the metal cutting insert, said at least one stepped cutting edge comprises a step formed by a transitional edge between a first part edge and a second part edge; characterized in that in a top view facing the top surface of the metal cutting insert, said step extends in a radial direction relative the symmetry axis a first distance $h1$; and in a side view facing the peripheral side surface of the metal cutting insert, said step extends in a direction from the bottom surface towards the top surface a second distance $h2$, wherein $0.8 \cdot h2 \leq h1 \leq 1.2 \cdot h2$. The step as seen in the top view coincide with the step as seen in the side view of the metal cutting insert.

According to one embodiment, the second distance $h2$ is $0.9 \cdot h1 \leq h2 \leq 1.1 \cdot h1$. This way the temperature increase in the transitional region is decreased.

According to one embodiment, the second distance $h2$ is $0.95 \cdot h1 \leq h2 \leq 1.05 \cdot h1$. This way the temperature increase in the transitional region is further decreased.

According to one embodiment, the first distance $h1$ is substantially equal to the second distance $h2$. This way the temperature increase in the transitional region is reduced in a preferable way.

According to one embodiment, the stepped cutting edge comprises a corner edge connected to the first part edge, and wherein said corner edge is connected to a second part edge of a further stepped cutting edge of the insert.

According to one embodiment, the corner part edge provides a continuous edge from the first part edge of the stepped cutting edge to said second part edge of the further stepped cutting edge. This way the corner edge allows a continuous edge to be formed around the whole metal cutting insert.

According to one embodiment, the transitional edge has a curved edge, wherein the curved edge has the same shape in said top view and said side view. This way a minimum of compression forces acts on the chip and thereby the temperature in the transitional region is reduced.

According to one embodiment, the insert comprises a through hole extending between the top surface and the bottom surface of the insert, which through hole is aligned along said symmetry axis and extends through the opposing top and bottom surfaces.

According to one embodiment, a plurality of stepped cutting edges are arranged symmetrically around said symmetry axis. According to one embodiment, said transitional edge provides a step in a positive radial direction relative the symmetry axis in the top view when moving along said stepped cutting edge in a counter-clockwise direction around said metal cutting drill insert. This way the second part edge is always the outermost edge of the first and second part edge in a radial direction when the metal cutting insert is mounted in a drill tool.

The present invention also relates to a metal cutting drill tool comprising an elongated drill body having a boring shaft and a mount shank. The metal cutting drill tool further comprises at least one drill insert according to embodiments described herein mounted at an end of the boring shaft.

Further advantages of the present invention will appear from the description following below.

LIST OF DRAWINGS

Figure 2:
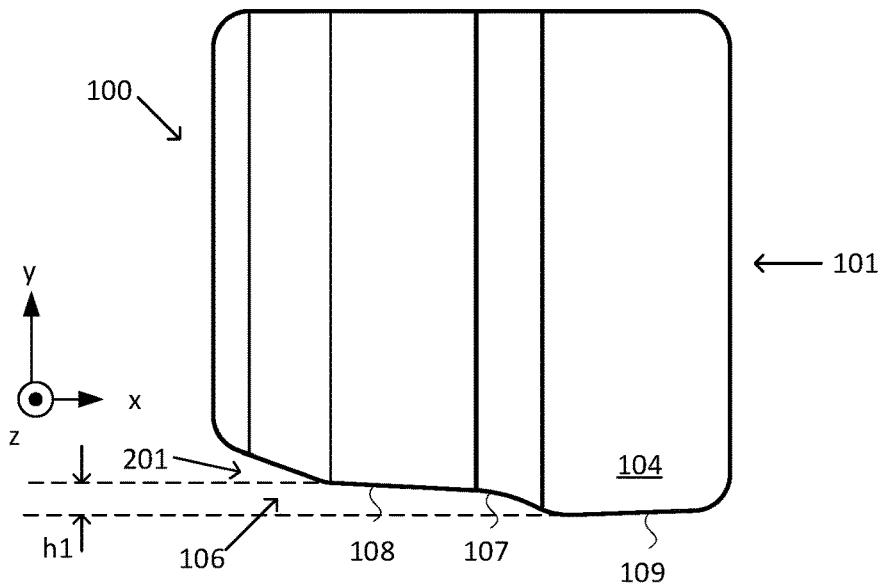
Figure 3:
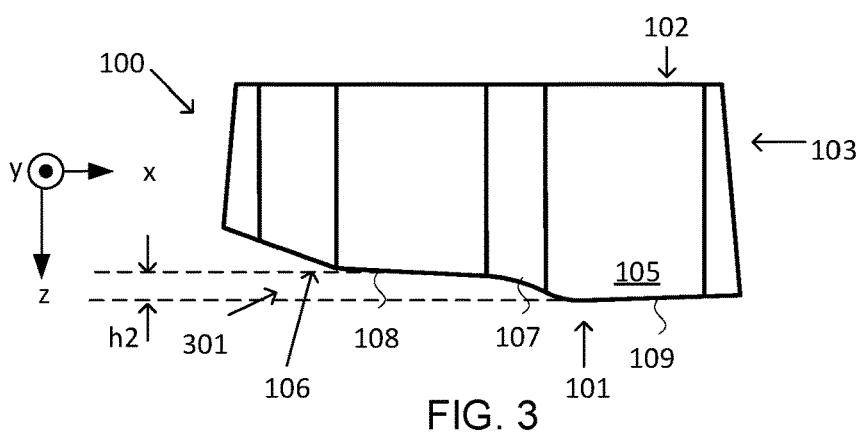

Embodiments of the invention will now be described in detail with regard to the annexed drawings, in which:

FIG. 1 is a perspective view of a metal cutting insert according to an embodiment of the present invention, FIG. 2 is a top view of the metal cutting insert shown in FIG. 1, FIG. 3 is a side view of the metal cutting insert shown in FIG. 1 and FIG. 2, FIG. 4 is a perspective view of a metal cutting insert according to an embodiment of the present invention, FIG. 5 is a top view of the metal cutting insert shown in FIG. 4, FIG. 6 is a side view of the metal cutting insert shown in FIG. 4 and FIG. 5, FIG. 7 is a side view of a drilling tool according to an embodiment of the present invention, and FIG. 8 is an end view of the drilling tool shown in FIG. 7.

DETAILED DESCRIPTION OF EMBODIMENTS

Reference is now made to FIG. 1-FIG. 3 which shows a first embodiment according to the present invention. In these figures a metal cutting drill insert for a drill tool is disclosed, generally designated 100, and designated 400 in FIG. 4. The metal cutting drill insert 100 comprises opposing top surface 101,401 and bottom surface 102,402 with a symmetry axis of the cutting drill insert extending there between, and a peripheral side surface 103,403 extends between said top surface and said bottom surface. The top surface 101,401 comprises a rake face 104,404 and the side surface 103,403 comprises a clearance face 105,405. The metal cutting drill insert further comprises at least one stepped cutting edge 106,406 configured to cut a continuous chip along said at least one stepped cutting edge. The at least one stepped cutting edge is formed at an intersection of a rake face 104,404 of the top surface 101,401 and an adjoining clearance face 105,405 of the side surface 103,403. In a top view facing the top surface of the metal cutting insert, said at least one stepped cutting edge comprises a step formed by a transitional edge 107,507 between a first part edge 108,508 and a second part edge 109,509.

The metal cutting drill insert is characterized in that in a top view, see FIG. 2, facing the top surface 101,401 of the metal cutting insert 100,400, said step extends in a radial direction relative the symmetry axis, a first distance h1. In a side view, see FIG. 3, facing the peripheral side surface 103,503 of the metal cutting insert 100,400, said step extends in a direction from the bottom surface towards the top surface, a second distance h2, wherein $0.8 \cdot h1 \leq h2 \leq 1.2 \cdot h1$. By having a step both in the top view and in the side view the compression of a chip is avoided and thus the temperature is reduced significantly.

The step as seen in the top view coincide with the step as seen in the side view of the metal cutting insert.

In another embodiment the second distance h2 is $0.9 \cdot h1 \leq h2 \leq 1.1 \cdot h1$.

In yet another embodiment the second distance h2 is $0.9 \cdot h1 \leq h2 \leq 1.05 \cdot h1$.

In a preferred embodiment the first distance h1 is substantially equal to the second distance h2. This will in theory be the optimal step height for optimum temperature reduction associated with chip evacuation over the transitional edge. This will provide a continuous chip to be formed and reduced transitional edge wear.

Now reference is made to FIG. 4-FIG. 6 which shows a second embodiment of a metal cutting drill insert, generally designated 400. The second embodiment of the metal cutting drill insert differs from the first embodiment described herein above with reference made to FIG. 1-FIG. 3 in that the second embodiment comprises a stepped cutting edge 406 which comprises a corner edge (510) connected to the first part edge 508, and wherein said corner edge 510 is connected to a second part edge (509') of a further stepped cutting edge (406') of the insert 500.

The corner edge 510 allows a continuous stepped cutting edge to be formed around the insert 500. The corner part edge provides a continuous edge from the first part edge of the stepped cutting edge to said second part edge of the further stepped cutting edge.

Now with reference made to FIG. 5 and FIG. 6. In FIG. 5 the metal cutting insert according to the second embodiment is disclosed in a top view, and in FIG. 6 the same insert is disclosed in a side view. The transitional edge 507 has a curved edge, wherein the curved edge has the same shape in said top view in FIG. 5 and said side view in FIG. 6.

The metal cutting drill 500 insert comprises a through hole 511 extending between the top surface 401 and the bottom surface 402 of the insert, which through hole is aligned along a symmetry axis 411 and extends through the opposing top 401 and bottom 402 surfaces.

In FIG. 5 a plurality of stepped cutting edges 406, 406' are arranged symmetrically around the symmetry axis.

Furthermore, FIG. 5 discloses that said transitional edge 507 provides a step in a positive radial direction relative the symmetry axis in the top view when moving along said stepped cutting edge 406,406' in a counter-clockwise direction around said metal cutting drill insert.

In FIG. 7 a metal cutting drill tool according to one embodiment is disclosed, generally designated 700. The drill tool 700 comprises an elongated drill body 701 having a boring shaft 702 and a mount shank 703 centered around a longitudinal axis 704. The drill tool 700 further comprises at least one drill insert 100,100',400,400' according to any one of the preceding claims mounted at an end of the boring shaft 702.

The boring shaft also exhibits a drill flute 705,705' associated with each insert for efficient chip evacuation and chip control.

In FIG. 8 a view facing the end of the boring shaft with the inserts is disclosed, wherein the drill tool 700 is configured for rotation around the longitudinal axis 704 in a counter-clockwise direction as indicated with R in the figure.

The invention claimed is:

1. A metal cutting drill insert for a drill tool comprising:
opposed top and bottom surfaces and an axis of the cutting drill insert extending there between, wherein a peripheral side surface extends between the top surface and the bottom surface, and wherein the top surface includes a rake face and the side surface includes a clearance face; and
at least one stepped cutting edge configured to cut a continuous chip along said at least one stepped cutting edge, wherein said at least one stepped cutting edge is formed at an intersection of the rake face of the top surface and the clearance face of the side surface, the rake face adjoining the clearance surface, wherein in a top view facing the top surface of the metal cutting insert, said at least one stepped cutting edge includes a step formed by a transitional edge disposed between a first part edge and a second part edge, wherein in the top view facing the top surface of the metal cutting insert said step extends in a radial direction to from the axis by a first distance h1, and in a side view facing the peripheral side surface of the metal cutting insert said step extends from the bottom surface towards the top surface by a second distance h2, wherein $0.8 \cdot h1 \leq h2 \leq 1.2 \cdot h1$, wherein the transitional edge has a curved edge, and wherein the curved edge has a same shape in the top view and the side view.

2. The metal cutting drill insert according to claim 1, wherein said second distance h2 is $0.9 \cdot h1 \leq h2 \leq 1.1 \cdot h1$.

3. The metal cutting drill insert according to claim 1, wherein said second distance h2 is $0.95 \cdot h1 \leq h2 \leq 1.05 \cdot h1$.

4. The metal cutting drill insert according to claim 1, wherein said stepped cutting edge includes a corner edge connected to the first part edge, and wherein said corner edge is connected to a second part edge of a further stepped cutting edge of the insert.

5. The metal cutting drill insert according to claim 1, wherein the corner part edge provides a continuous edge from the first part edge of the stepped cutting edge to said second part edge of the further stepped cutting edge.

6. The metal cutting drill insert according to claim 1, wherein said transitional edge has a curved edge, wherein the curved edge has a same shape in said top view and said side view.

7. The metal cutting drill insert according to claim 1, further comprising a through hole extending between the top surface and the bottom surface of the insert, wherein the through hole is aligned along said axis and extends through the opposing top and bottom surfaces.

8. The metal cutting drill insert according to claim 1, wherein a plurality of stepped cutting edges are arranged symmetrically around said axis.

9. The metal cutting drill insert according to claim 1, wherein the step extends in a positive radial direction relative to the axis in the top view when moving along said stepped cutting edge in a counter-clockwise direction around said metal cutting drill insert.

10. A metal cutting drill tool comprising:
- an elongated drill body having a boring shaft and a mount shank; and
- at least one drill insert according to claim 1 mounted at an end of the boring shaft.

* * * * *